(12) United States Patent
Olrog (10) Patent No.: US 9,552,035 B2
(45) Date of Patent: Jan. 24, 2017

(54) METHOD, NODE AND COMPUTER PROGRAM FOR RESET OF TIMERS

(71) Applicant: Telefonaktiebolaget L M Ericsson (publ), Stockholm (SE)

(72) Inventor: Christian Olrog, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 54 days.

(21) Appl. No.: 14/432,926

(22) PCT Filed: Oct. 11, 2012

(86) PCT No.: PCT/EP2012/070148
§ 371 (c)(1),
(2) Date: Apr. 1, 2015

(87) PCT Pub. No.: WO2014/056536
PCT Pub. Date: Apr. 17, 2014

(65) Prior Publication Data
US 2015/0277529 A1 Oct. 1, 2015

(51) Int. Cl.
*G06F 1/32* (2006.01)
*H04W 52/02* (2009.01)

(52) U.S. Cl.
CPC ........... *G06F 1/3203* (2013.01); *G06F 1/3278* (2013.01); *H04W 52/02* (2013.01); *H04W 52/0216* (2013.01); *H04W 52/0254* (2013.01); *Y02B 60/126* (2013.01)

(58) Field of Classification Search
CPC ..... G06F 1/3203; G06F 1/3278; H04W 52/02; H04W 52/0216; H04W 52/0254; Y02B 60/126

See application file for complete search history.

(56) References Cited

U.S. PATENT DOCUMENTS

| 8,576,762 | B2* | 11/2013 | Thomas | ............ H04W 52/0216 370/311 |
| 9,060,337 | B2* | 6/2015 | Sanders | ................ H04W 52/02 |
| 2003/0036354 | A1 | 2/2003 | Lee et al. | |
| 2003/0153368 | A1 | 8/2003 | Bussan et al. | |

(Continued)

OTHER PUBLICATIONS

International Search Report for International application No. PCT/EP2012/070148, Jun. 26, 2013.

*Primary Examiner* — M Elamin
(74) *Attorney, Agent, or Firm* — Patent Portfolio Builders, PLLC (57) ABSTRACT

A method, node and computer program for a client node (100) in a communications system for resetting of timer units, the client node comprising at least two timer units, the method comprising: for each of the timer units: detecting (S100) the timer unit (130) by a timer handling unit (110), registrating (S110) the detected timer unit (130) in a timer inventory (140) by the timer handling unit (110), the method further comprising: determining (S120) by the timer handling unit (110) which of the at least two timer units that expires first, determining (S130) a time T when the determined timer unit at the latest will be reset, and prior to the timer expiring, resetting (S140) at least one of the other timer units (130) with a new reset time based on the time T, thereby enabling longer radio and CPU sleep periods of the client node between reset of timer units.

18 Claims, 4 Drawing Sheets

(56) References Cited

U.S. PATENT DOCUMENTS

2009/0140844 A1    6/2009  Roychowdhury
2010/0195507 A1*   8/2010  Marinier .................. H04L 1/20
                                                      370/242
2014/0056198 A1*   2/2014  Quan ................ H04W 52/0216
                                                      370/311

* cited by examiner

METHOD, NODE AND COMPUTER PROGRAM FOR RESET OF TIMERS

PRIORITY

This nonprovisional application is a U.S. National Stage Filing under 35 U.S.C. §371 of International Patent Application Serial No. PCT/EP2012/070148, filed Oct. 11, 2012, and entitled "Method, Node and Computer Program For Reset of Timers."

TECHNICAL FIELD

The present disclosure relates generally to a method, node and computer program for reset of timer units in a client node.

BACKGROUND

Client nodes of today are providing more and more computing power. The increased computing power, such as CPU- and memory capacity, allows client nodes to provide a larger variety of services than before. Client nodes, such as mobile devices, mobile handsets, portable computers, PDA's, wireless devices for home automation, sensors and similar, are providing an increasing variety of services. A few examples of such services besides pure telephony are, instant messaging, e-mail, voice over IP, video telephony, web-browsing, social networking, news feeds, home automation, surveillance services, multimedia services, etc.

An example is mobile handsets, which in the beginning was a pure telephone, which evolved over SMS and phone book-type of services, to today's smart phones comprising almost the same services as a stationary personal computer.

The development of electronics has created better power efficiency and battery development has created batteries with higher energy density. However, the market demand for more slim and light weight devices in combination with the more powerful CPU's and increased data transmission bandwidth are not always compensated by the increased electronics energy efficiency, and batteries with higher energy density. The more services which are being used on the client node, the more electrical power is needed. Sometimes the service's activity is not always transparent to a user, which may cause unexpected or undesired battery drainage. A reset of a timer unit is an example of non user activated activity. The timer unit may be needed to be reset in order to maintain service transparency, or network connectivity. Timer reset may also be denoted timer expiration, timer fire, timer event, or similar terms for when a timer is about to reach an endpoint. The procedure related to the reset of the timer unit may however momentary accelerate the electrical power consumption of the battery power.

It is a desire to conserve battery energy to make it last as long as possible. It is therefore a problem how to preserve battery energy, in combination with a smooth user experience.

SUMMARY

It is an object of the invention to address at least some of the problems and issues outlined above. It is possible to achieve these objects and others by using a method, a node and a computer program as defined in the attached independent claims.

According to one aspect, a method is provided in a client node in a communications system for resetting of timer units. The client node comprises at least two timer units. The method comprising, for each of the timer units, detecting the timer unit by a timer handling unit, and registrating the detected timer unit in a timer inventory by the timer handling unit. The method further comprises determining by the timer handling unit which of the at least two timer units that expires first. Further determining a time T when the determined timer unit at the latest will be reset, and prior to the timer expiring, resetting at least one of the other timer units with a new reset time based on the time T. Thereby is longer radio and CPU sleep periods of the client node between reset of timer units enabled.

An advantage with resetting of at least two timers together, such that longer CPU and radio sleep periods is enabled, is that the energy in a battery may be preserved and prolog the battery life time between charges.

According to another aspect, a client node in a communications system configured to reset timer units is provided. The client node comprises at least two timer units. The client node is for each of the timer units, configured to detect the timer unit by a timer handling unit, configured to register the detected timer units in a timer inventory by the timer handling unit. The node is further configured to determine by the timer handling unit which of the at least two timer units that expires first. The node is further configured to determine by the timer handling unit a time T when the determined timer unit at the latest will be reset, and prior to the timer expiring, configured to reset at least one of the other timer units with a new reset time based on the time T by the timer handling unit. Thereby is longer radio and CPU sleep periods of the client node between reset of timer units enabled.

An advantage with a client node with at least two timer units reset grouped together is less power consumption by the client node. A further advantage with less power consumption is that a smaller battery may be needed for provision of power to the client node, or the client node may provide more services without need for a larger battery.

According to another aspect, a computer program, comprising computer readable code means, which when run in a client node configured to reset timer units, causes the client node configured to reset timers to perform the corresponding method.

The above method, node and computer program may be configured and implemented according to different optional embodiments. A possible embodiment comprises transmitting a reset instruction comprising the new reset time to a plurality of timer units from the timer handling unit. Another possible embodiment comprises detecting if one of the timer units is reset prior to the time T by the timer handling unit, wherein the other timer units in the timer inventory is reset by the timer handling unit. Another possible embodiment is the time T calculated at least partly based on a randomizing and/or fuzzy factor. Another possible embodiment comprises determining by the timer handling unit, if a radio unit of the client node is active, and resetting at least one of the timer units registered in the timer inventory. Another possible embodiment are predicted reset events determined as at least one of high priority reset events and low priority reset events, wherein reset events are grouped into at least two groups by the timer handling unit based on the determined priority. Another possible embodiment comprises muting a reset event or a group of reset events, which are determined as a predetermined priority, thereby enabling longer radio and CPU sleep periods of the client node between reset of timer units. Another possible embodiment is the communication system using IMS technology and/or XMPP technology.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable energy saving in a client node and thereby prolonged operational time between battery charges. Despite development of green type of electronics, supposed to consume less electrical power, and batteries with better energy density, battery life time between charges is an issue for today's users of client nodes such as mobile devices. One reason for battery drainage is the recent year's exceptional development of computing power in client nodes. Another reason for battery drainage is the substantial increase of bandwidth availability. The computing power provided by the CPU and the bandwidth provided by a radio unit need more electrical energy for higher provided computing power and bandwidth.

Various solutions proposes to reduce the clock frequency of the CPU and/or the radio unit in periods of lower activity, as well as putting the CPU and/or the radio unit in various stand by modes or sleep modes. A client node put in an energy saving sleep mode, may prolong the battery operated time substantially. However, if the sleep periods are too short, or interrupted too frequently, the benefit of putting the client node in sleep mode may be lost. Therefore it is a desire, from a battery standpoint to maintain the sleep mode, as long as possible.

One of the reasons for waking up the CPU and the radio unit, is when a timer is about to expire. An example may be a SIP-session timer (SIP—Session Initiation Protocol), which may be needed to be renewed within certain time intervals to maintain connectivity. For this particular example, when the timer is about to expire, the CPU and radio unit must be activated in order to renew the SIP-session in contact with a SIP-server. A modern client unit, such as a mobile device, PDA, or similar, may contain a plurality of timers. If all the timers uncoordinated are allowed to active the CPU and the radio unit, the sleep periods may be limited down to minutes. If the timers on the other hand, are coordinated, the sleep periods potentially may be prolonged to hours, or even longer. Thereby, the operational time based on a single battery charge may be prolonged.

A timer unit used in a scenario, for example described in this disclosure, may work according to the following. When a timer unit is reset, it has a predetermined expiry time. The timer should be reset prior reaching the timer unit expiry time. In DHCP (Dynamic Host Configuration Protocol) an IP-address (Internet Protocol) is requested for example when a device is booting or connected to a DHCP-enabled network. The device may be provided with a leased IP-address. As long as the timer unit for the IP-address lease is reset, including a proper renews procedure, the device may keep the IP-address and have continuous network connectivity. If the timer unit controlling the lease time expires, the device may lose the IP-address and consequently the network connectivity. This is an illustrative example of a timer unit usage and purpose, for example in a client node.

Figure 1:
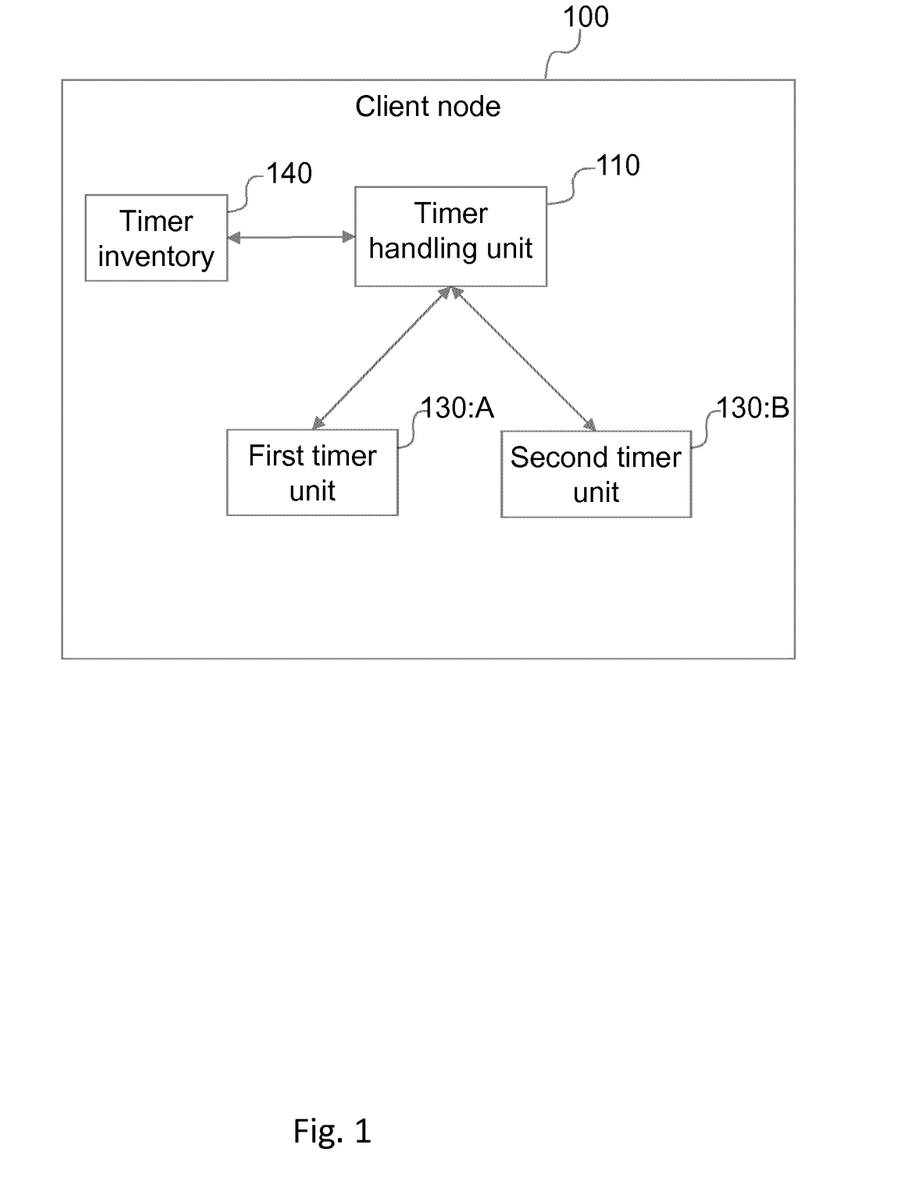
FIG. 1 is a block diagram illustrating a client node.

FIG. 1 shows a block diagram of a client node 100, with a timer handling unit 110, timer units 130 and a timer inventory 140.

The client node 100 in a communications system is configured to reset timer units 130 by use of the timer handling unit 110. In an embodiment, the client node 100 comprises at least two timer units 130. The client node 100 is configured to detect each timer unit 130, by use of the timer handling unit 110. When each timer unit 130 is detected by the timer handling unit 110, the client node 100 is, by use of the timer handling unit 110, configured to register each timer unit 130 in a timer inventory 140. The client node 100 is further configured to, by use of the timer handling unit 110, determine which of at least two timer units 130 that will be first in time to expire. Further it will be determined by the timer handling unit 110, when the first timer unit, for example the first timer unit 130:A, at the latest should be reset, prior to the timer expiring based on a time T. The client node 100 is further configured to by the timer handling unit 110, reset at least one of the other timer units 130, with a new reset time based on the time T. Thereby is the CPU and/or radio unit enabled to longer sleep periods, by grouping reset of timer units 130 together. Another term for grouping timer reset events may be clustering of timer reset events, not limiting other suitable terms to be used.

Figure 2:
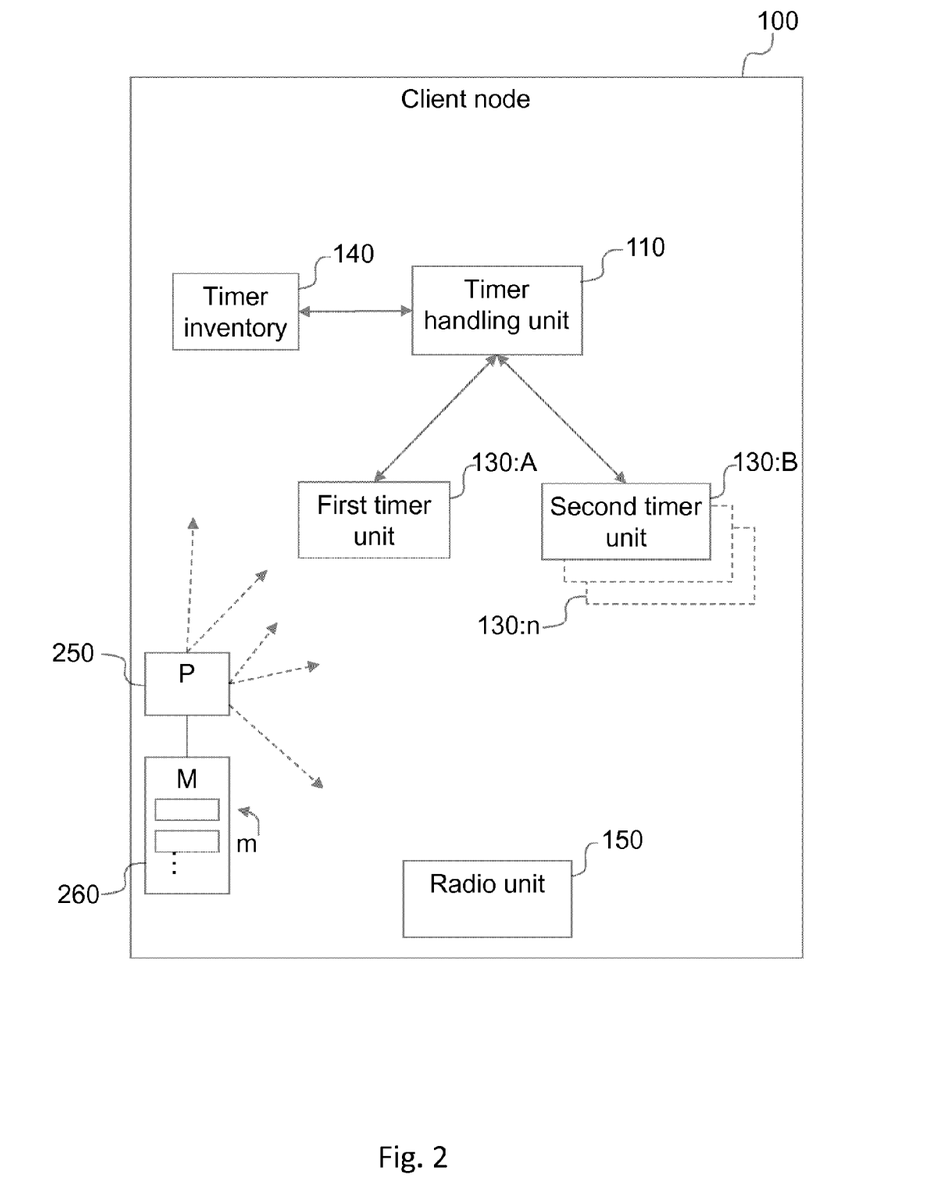
FIG. 2 is a block diagram illustrating a client node, according to some possible embodiments.

FIG. 2 shows a block diagram illustrating some possible embodiments of a client node 100. The figure shows the timer handling unit 110, timer units 130, the timer inventory 140, further a radio unit 150 for communication and a processing unit 250 and a memory unit 260.

The timer handling unit 110, comprised by the client node 100, may be configured to transmit a reset instruction to a plurality of timer units 130. The reset instruction may include the new reset time, or an instruction to immediately reset. The reset instruction may be transmitted to a subset of all timer units 130, or to all timer units 130. The timer handling unit 110 may detect if a timer unit 130 is reset, prior to the time T. If the timer handling unit 130 detects such a reset of a timer unit 130, the timer handling unit 110 may reset the remaining timer units 130, or reset a subset of the timer units 130.

A reset of a timer unit 130 may be caused by user interaction, network disturbance or other activities, not initiated by an expected timer expiry. If a timer for any reason is reset prior to the expiry time, at least one of the other timers may also be reset. If a timer for any reason is reset prior to the expiry time, all of the other timers may also be reset. The time T calculated for when a timer should be reset, may be calculated at least partially based on a randomizing and/or fuzzy factor. A non limiting example of such randomizing and/or fuzzy factor is: expiry_in_seconds/2−random(expiry_in_seconds*10%. The time, here described in seconds, may be dynamically determined or determined by a person skilled in the art. The fuzzy factor may also include a dynamic randomized component, for example based on a time since last transmitted message, not limiting other types fuzzy adding factors to be used. Adding a randomizing and/or fuzzy factor is advantageous, for example, to avoid too many client nodes 100 trying to connect to a server node simultaneously.

If the radio unit is activated for some other reason than in relation to a timer reset, e.g. user activity or network updates, the timer handling unit 110 may detect that the radio unit 150 is active. If the timer handling unit 110 detects radio unit 150 activity, the timer handling unit 110 may reset at least one of the other timer units 130.

Predicted reset events may be divided into different groups. A non limiting example of such categories is reset events of high priority and reset events of low priority. High priority reset events may be for example telephony related timers, or network connectivity related timers. Low priority reset events may for example be related to non-critical, momentary or short lived states which are easily renewed at a slightly later stage. They may involve user preferences for a specific state. Further examples include but are not limited to email pull, presence status subscription renewal, sending of own presence, etc. The determined priority may be used to group reset events into different groups, based on the determined priority. The determination of priority of reset events may be performed by the timer handling unit 110, or preconfigured, or by any similar way. A reset event or a group of reset events determined as a predetermined priority may be muted. An example is if a timer unit 130 is determined as low priority, that timer unit 130 is muted, or not allowed to initiate a reset procedure. Instead the timer unit 130 is allowed to expire. The timer unit 130 may be reset at a later point in time, together with other timer units grouped together.

Timer units 130 may be applied to a number of different functions or systems in a client node 100. A few examples are as follows. In SIP (Session Initiation Protocol) there are a number of different applications, such as telephony, presence, buddy lists, IMS (IP Multimedia Subsystem part of Next Generation Networking) and similar. Each application using the SIP-protocol may include at least one timer unit 130. In other protocols such as XMPP (Extensible Messaging and Presence Protocol), there are similar applications as in SIP. Further, there are for example generic timers related to network connectivity supporting the TCP/IP-communication (Transfer Control Protocol/IP Protocol), not limiting to other generic timers. A client node 100 may comprise a plurality of timer handling units 110 and/or timer inventories 140.

In this disclosure the term "timer" may include both timer, stop watch, counter, or a clock. The function provided by a timer may include, but is not limited to, counting time from a value down to zero, counting time from zero to a value, counting time to an absolute value, or any other appropriate means of measuring time. A timer may be implemented as function provided by hardware electronics, a function provided by computer program software, or a combination of hardware and software. A timer inventory 140 may be for example a text-file, a database, or another storage suitable for timer units 130. Communication between a timer handling unit 110, timer units 130, and a timer inventory 140 may be handled by standard API's (Application Programming Interface), programming runtime interrupts, a software or hardware component handling communication flows where timers are needed. Communication may be performed over a well defined private or publicly exposed interface, such as e.g. programming API, hardware interface "bus", to request timer related activations in a manner that multiple non related requesting components may share the timer infrastructure. An example of an API that may be used is the "java.util.concurrent.ScheduledThreadPoolExecutor" class in the Java programming environment for the Android mobile operating system, not limiting other techniques, based on open standards or technologies, or based on various proprietary techniques. Further examples are using high level protocols such as TCP/UDP/IP (Transfer Control Protocol/User Datagram Protocol/Internet Protocol). A reset instruction, transmitted from the timer handling unit 110 to a timer unit 130 may include an instruction to immediately reset, reset within a time period of length X, reset at time point Y, or similar.

The functional units 110, 130, 140, and 150 described above may be implemented in the client node 100, by means of program modules of a respective computer program comprising code means which, when run by processor "P" 250 causes the client node 100 to perform the above-described actions. The processor P 250 may comprise a single Central Processing Unit (CPU), or could comprise two or more processing units. For example, the processor P 250 may include general purpose microprocessors, instruction set processors and/or related chips sets and/or special purpose microprocessors such as Application Specific Integrated Circuits (ASICs). The processor P 250 may also comprise a storage for caching purposes.

Each computer program may be carried by computer program products "M" 260 in the client node 100, shown in FIG. 2, in the form of memories having a computer readable medium and being connected to the processor P. Each computer program product M 260 or memory thus comprises a computer readable medium on which the computer program is stored e.g. in the form of computer program modules "m". For example, the memories M 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the client node 100.

Figure 3:
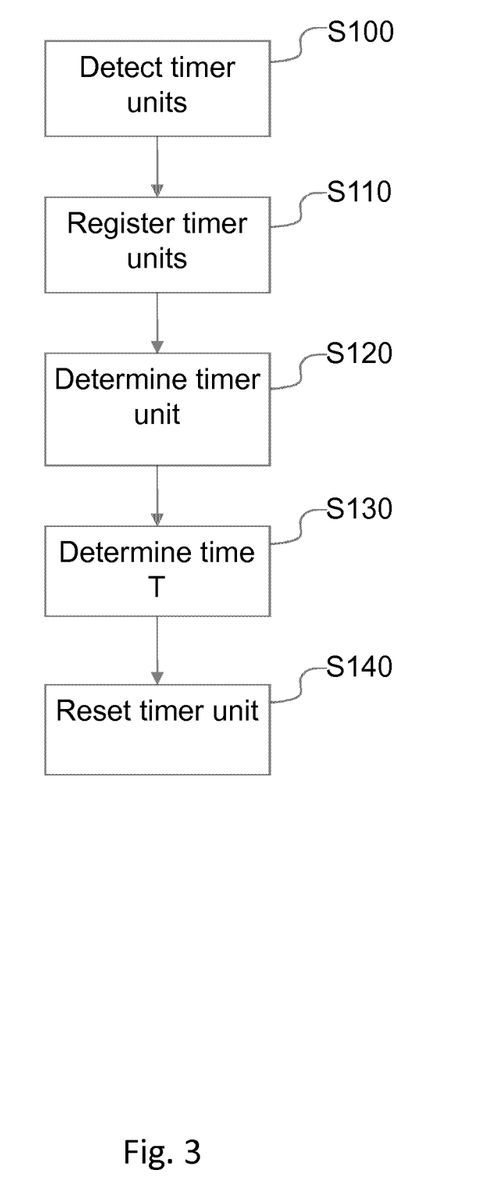
FIG. 3 is a flow chart illustrating a procedure in a client node.

FIG. 3 shows a flow chart illustrating a procedure in a client node 100. The actions described in the following steps may come in a different order than described. In a step S100 timer units are detected, timer units such as timer units 130, shown in FIGS. 1 and 2. The timer units may be detected by a timer handling unit 130, such as the timer handling unit shown in FIGS. 1 and 2. In a step S110, detected timer units are registered in a timer inventory, such as the timer inventory 140 shown in FIGS. 1 and 2. In a step S120 it is determined which of the at least two timer units, a first timer unit and a second timer unit, that expires first. In a step S130 a time T is determined, the time to when the determined timer unit at the latest should be reset, prior to the timer unit expiring. In a step S140 at least one of the other timer units is reset based on the time T. Thereby, the client node is enabled to have longer radio and CPU sleep periods between reset of timer units.

Figure 4:
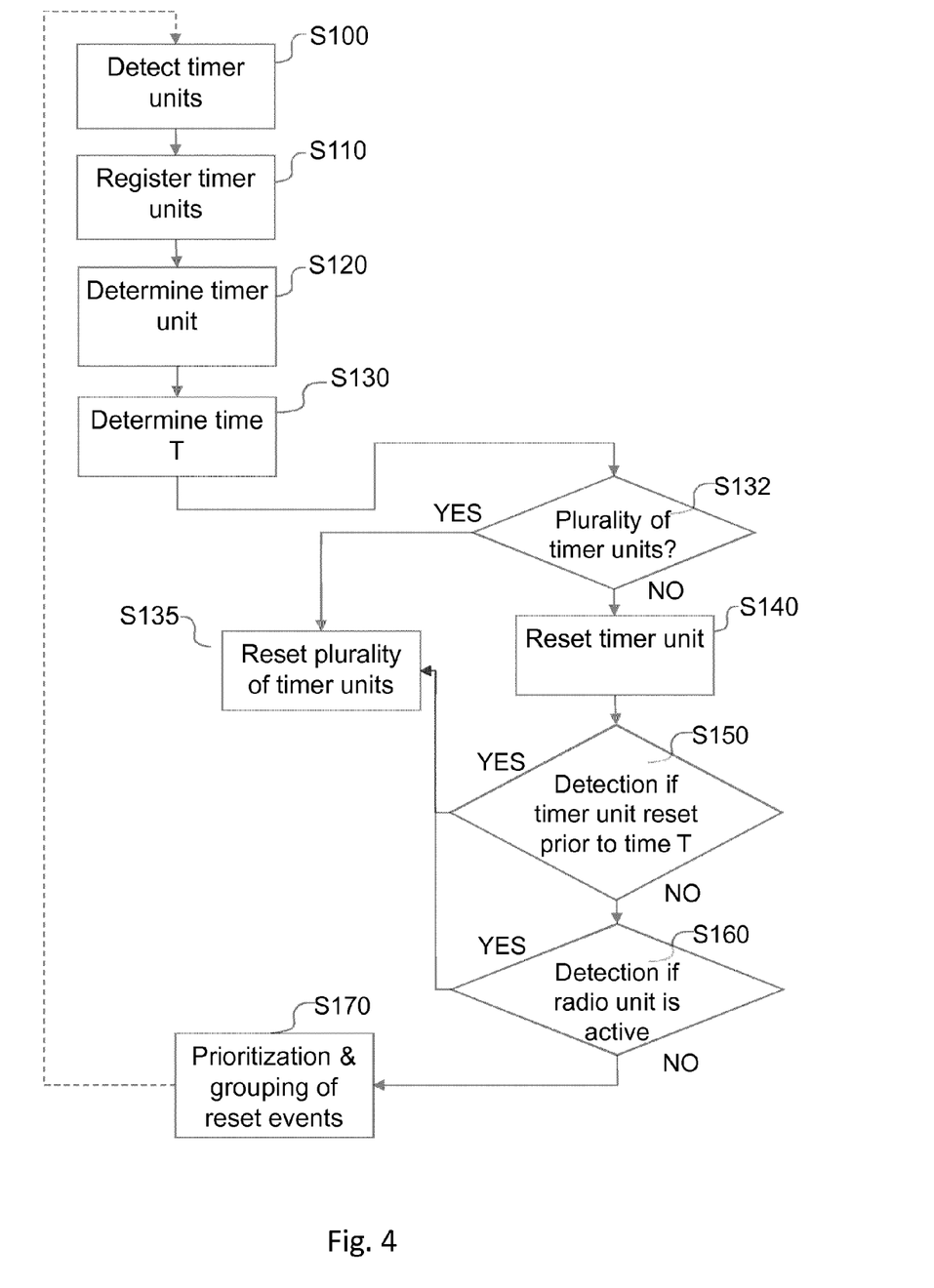
FIG. 4 is a flow chart illustrating a procedure in a client node, according to further possible embodiments.

FIG. 4 shows a flow chart illustrating a procedure in a client node, according to further possible embodiments. Action steps with the same reference number in FIG. 3 as in FIG. 4, corresponds to the same action.

In a step S132 it is determined if a plurality of timer units should be reset. If a plurality of timer units should be reset, a reset instruction may be transmitted to the plurality of timer units. The transmit instruction may include a reset time. In a step S135 the plurality of timer units are reset. The timer units may be reset at the same time, or the timer units may be reset with a dislocation in time. The dislocation may be based on a randomizing and/or fuzzy factor, for example as previously described. In a step S150 it is detected if a timer unit is reset prior to a determined time. Such a reset may be for example trigged by user interaction, network activity, configuration changes, or other activities in the client node or activities influencing the client node from a network.

If a timer unit is reset and if the reset of the timer unit causes the CPU and/or radio unit to disrupt a sleep period, in a step S160 it may be detected and may be determined that at least one of the other timer units may be reset. This action is advantageous because if the CPU and/or radio unit in any way is activated, the sleep period until next activation may be prolonged, than it otherwise would have been. In a step S170 reset events may be prioritized. The reset events may be prioritized into high priority and low priority reset events. The reset events may also be prioritized into various categories, such as from 1 to 10, or from A to D, not limiting to other types of prioritizations or classifications. When reset events are prioritized they may be grouped together. Further the grouped reset events may be reset in an order such that as long CPU and radio unit sleep period as possible is achieved. Reset events determined to belong a group with low priority timer reset events, may be muted. The determination to low priority or other priority may be predetermined, or dynamically determined. By muting reset timer events, it may be avoided to allow timers with a low priority to drain battery energy. It may be acceptable to allow such timers to expiry, and renew at a more suitable point of time, where there the CPU or radio unit in any way is activated. A few non limiting examples of technologies are: SIP (Session Initiation Protocol) comprising a number of different applications, such as telephony, presence, buddy lists, and similar. IMS (IP Multimedia Subsystem part of Next Generation Networking). Each application using the SIP-protocol may include at least one timer unit 130. In other protocols such as XMPP (Extensible Messaging and Presence Protocol), there are similar applications as in SIP. Further, there are for example generic timers related to network connectivity supporting the TCP/IP-communication (Transfer Control Protocol/IP Protocol), not limiting to other generic timers.

While the solution has been described with reference to specific exemplary embodiments, the description is generally only intended to illustrate the inventive concept and should not be taken as limiting the scope of the solution. For example, the terms "timer", "client node" and "timer handling unit" have been used throughout this description, although any other corresponding nodes, functions, and/or parameters could also be used having the features and characteristics described here. The solution is defined by the appended claims.

The invention claimed is:

1. A method in a client node in a communications system for resetting of timer units, the client node comprising at least two timer units, the method comprising:
   for each of the timer units:
      detecting the timer unit by a timer handling unit,
      registering the detected timer unit in a timer inventory by the timer handling unit,
   the method further comprising:
      determining, by the timer handling unit, which of the at least two timer units expires first,
      determining a time T as the latest time at which the determined timer unit will be reset, and
      resetting, prior to the time T expiring, at least one of the other timer units with a new reset time based on the time T, thereby enabling longer radio and CPU sleep periods of the client node between reset of timer units.

2. The method according to claim 1, comprising
   transmitting a reset instruction comprising the new reset time to a plurality of timer units from the timer handling unit.

3. The method according to claim 1, comprising
   detecting if one of the timer units is reset prior to the time T by the timer handling unit, wherein
   the other timer units in the timer inventory are reset by the timer handling unit.

4. The method according to claim 1, wherein
   the time T is calculated at least partly based on a randomizing and/or fuzzy factor.

5. The method according to claim 1, comprising
   determining by the timer handling unit, if a radio unit of the client node is active, and
   resetting at least one of the timer units registered in the timer inventory.

6. The method according to claim 1, wherein
   predicted reset events are determined as at least one of high priority reset events and low priority reset events, wherein
   reset events are grouped into at least two groups by the timer handling unit based on the determined priority.

7. The method according to claim 6, comprising
   muting a reset event or a group of reset events, which are determined as a predetermined priority, thereby enabling longer radio and CPU sleep periods of the client node between reset of timer units.

8. The method according to claim 1, wherein
   the communication system uses IMS technology and/or XMPP technology.

9. A client node in a communications system configured to reset timer units, the client node comprising at least two timer units, the node being configured to:
   detect the timer unit by a timer handling unit,
   register the detected timer units in a timer inventory by the timer handling unit wherein
   the node is further configured to:
      determine, by the timer handling unit, which of the at least two timer units expires first,
      determine, by the timer handling unit, a time T as the latest time at which the determined timer unit will be reset, and prior to the time T expiring,
      reset, by the timer handling unit, at least one of the other timer units with a new reset time based on the time T, thereby enabling longer radio and CPU sleep periods of the client node between reset of timer units.

10. The client node according to claim 9, wherein
   the client node is configured to transmit a reset instruction comprising the new reset time to a plurality of timer units from the timer handling unit.

11. The client node according to claim 9, wherein
   the client node is configured to detect if one of the timer units is reset prior to the time T by the timer handling unit, wherein
   the client node is configured to reset the other timer units in the timer inventory by the timer handling unit.

12. The client node according to claim 9, wherein
   the time T is calculated at least partly based on a randomizing and/or fuzzy factor.

13. The client node according to claim 9, wherein
the client node is configured to determine, by the timer handling unit, if a radio unit of the client node is active, and
the client node (100) is configured to reset at least one of the timer units registered in the timer inventory.

14. The client node according to claim 9, wherein
predicted reset events are determined as at least one of high priority reset events and low priority reset events, wherein
reset events are grouped into at least two groups by the timer handling unit based on the determined priority.

15. The client node according to claim 14, wherein
the client node is configured to mute a reset event or a group of reset events, which are determined as a predetermined priority, thereby enabling longer radio and CPU sleep periods of the client node between reset of timer units.

16. The client node according to claim 9, wherein
the communication system uses IMS technology and/or XMPP technology.

17. A computer program, comprising computer readable code operable to cause a client node configured to reset timers to perform the method of claim 1.

18. A computer program product, comprising a computer readable medium and a computer program according to claim 17, wherein the computer program is stored on the computer readable medium.

* * * * *